No. 723,195. PATENTED MAR. 17, 1903.
J. H. CRAMER.
LAMB OR CALF FEEDER.
APPLICATION FILED DEC. 13, 1902.
NO MODEL.
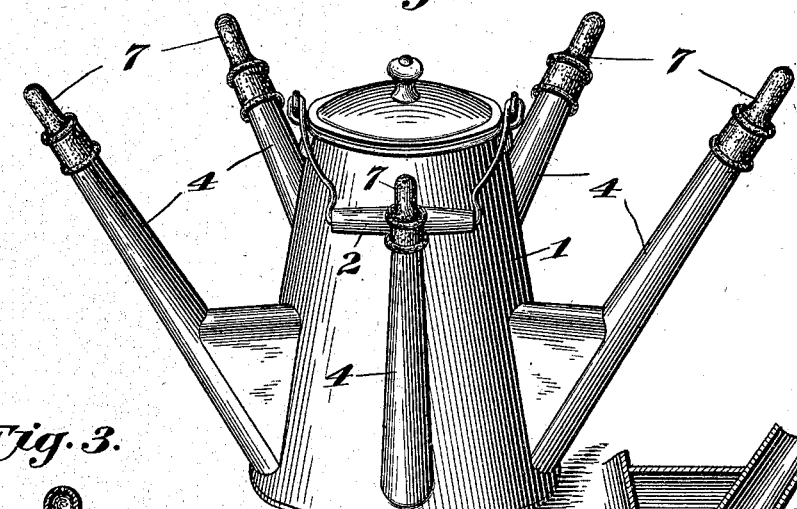
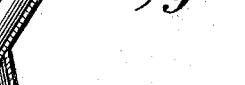
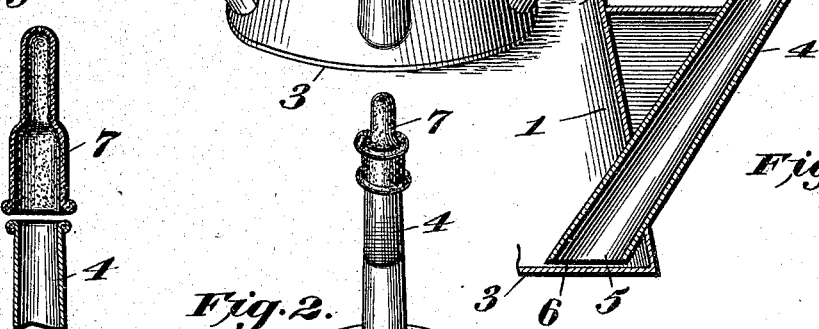
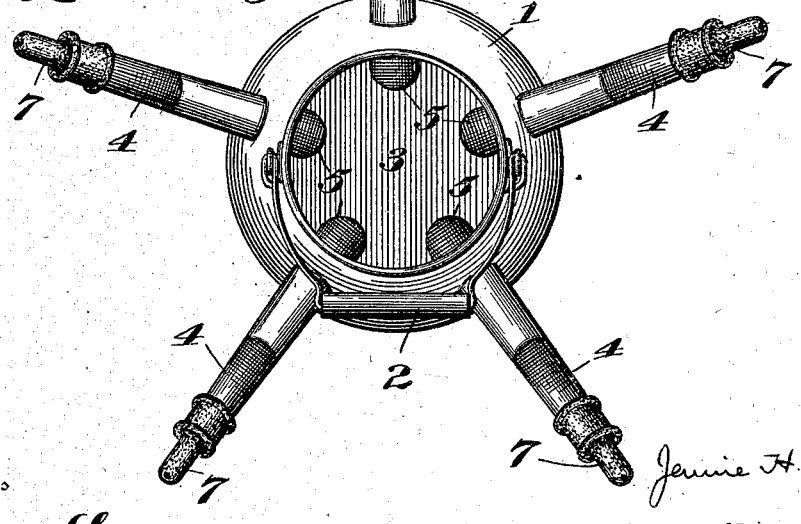

UNITED STATES PATENT OFFICE.

JENNIE H. CRAMER, OF UPPER SANDUSKY, OHIO.

LAMB OR CALF FEEDER.

SPECIFICATION forming part of Letters Patent No. 723,195, dated March 17, 1903.

Application filed December 13, 1902. Serial No. 135,067. (No model.)

*To all whom it may concern:*

Be it known that I, JENNIE H. CRAMER, a citizen of the United States, residing at Upper Sandusky, county of Wyandot, and State of Ohio, have invented certain new and useful Improvements in Lamb or Calf Feeders, of which the following is a specification.

My invention relates to lamb-feeders.

The object of the invention is the provision of a lamb-feeder of simple and improved construction which can be produced cheaply and which will be light and portable, so that it can be easily carried from place to place and left where it is desired to feed the young lambs—as, for instance, at any point in a barn, at night during cold weather, where the young lambs are kept.

My purpose is to provide a lamb-feeder adapted to be filled with warm milk, which, owing to its peculiar construction, will be adapted to the feeding of a number of lambs at the same time without their interfering with each other and to make provision for the complete draining of the receptacle containing the milk by the lambs, and thus to obviate a serious objection incident to lamb-feeders as heretofore constructed. Heretofore provision has not been made in a portable lamb-feeder which can be set down anywhere for the feeding of a number of lambs at the same time and for the complete draining off of all of the milk. In such lamb-feeders the action is imperfect, which leaves a layer or film of milk in the bottom of the receptacle which the lambs cannot obtain.

To accomplish the foregoing objects, I provide a portable receptacle or vessel which may be provided with a handle, if desired, and which can be set down at any desired place, and tubes which extend into the receptacle and upwardly and outwardly therefrom at different points and are provided with nipples, such tubes having their suction ends disposed just a trifle above the bottom of the receptacle or vessel, as will appear more fully hereinafter.

The novel features of the invention will be recited in the appended claims.

In the accompanying drawings, Figure is a perspective view; Fig. 2, a plan view with the cover removed; Fig. 3, a detail of the upper end of one of the tubes with the nipple shown removed, and Fig. 4 a detail view showing the suction end of one of the tubes.

The numeral 1 represents a receptacle which can be of any desired size and provided with a flared bottom, if desired. By preference it is provided with a handle 2, so that it can be conveniently carried from place to place. The bottom 3 of the receptacle is by preference flat.

The numerals 4 designate a plurality of suction-tubes which extend through the sides of the receptacle and are open at their lower ends 5, which terminate just a trifle above the bottom 3 of the receptacle, with their margins 6 substantially parallel to said bottom. The tubes extend upwardly and outwardly, preferably diverging, as shown, and at their upper ends are provided with the removable rubber nipples 7. As many of the tubes can be employed as found desirable, and it will be seen that provision is thus made for carrying the feeder to any point where needed and setting it down to permit a number of lambs to draw off the milk simultaneously. Leakage cannot occur, as in those forms of lamb-feeders where the point of feeding by the lambs is below the level of the fluid, and there is no fluid-pressure on the nipples. The peculiar disposition of the lower or suction ends of the tubes just above the bottom of the receptacle insures practically a perfect drawing off of all the milk. The nipples can be removed at any time to permit flushing or cleansing of the tubes and receptacle.

I am aware that changes of construction could be resorted to without departing from the spirit of the invention, and I lay claim to all modifications falling within the scope of the invention.

Having thus described my invention, what I claim as new, and desire to secure by Letters Patent, is—

1. A lamb-feeder comprising a receptacle, and a plurality of upwardly and outwardly extending suction-tubes for drawing off the fluid from the receptacle having suction-mouths at their lower ends and their upper ends projecting freely for use.

2. A lamb-feeder comprising a receptacle, and a plurality of upwardly-extending diverging suction-tubes for drawing off the contents of the receptacle having suction-mouths at their lower ends and their upper ends projecting freely for use.

3. A lamb-feeder comprising a receptacle, and an upwardly-extending suction-tube connected to the side of the receptacle and having a suction-mouth located substantially at the level of the bottom of the receptacle.

4. A lamb-feeder comprising a receptacle, and a suction-tube extending through the side of the receptacle and having a suction-mouth whose margin is located immediately above the bottom of the receptacle and substantially parallel thereto.

5. A lamb-feeder comprising a receptacle, and an inclined upwardly-extending suction-tube let through the side of the receptacle and provided with a suction-mouth located immediately above the bottom of the receptacle said tube having an upper end projecting freely for use.

6. A lamb-feeder comprising a receptacle adapted to be set directly on the ground, and a plurality of upwardly and outwardly extending suction-tubes let through the sides of the receptacle near the bottom thereof and having at their lower ends suction-mouths located immediately over the bottom of the receptacle and provided with freely-projecting nipples in their upper ends.

In testimony whereof I hereunto affix my signature in presence of two witnesses.

JENNIE H. CRAMER.

Witnesses:
CHAS. SLEMMER,
THOS. B. ROGERS.